US012165619B2

(12) United States Patent
Ikonen

(10) Patent No.: US 12,165,619 B2
(45) Date of Patent: Dec. 10, 2024

(54) MICRO-TUNING DEVICE

(71) Applicant: Kari Ikonen, Helsinki (FI)

(72) Inventor: Kari Ikonen, Helsinki (FI)

( * ) Notice: Subject to any disclaimer, the term of this patent is extended or adjusted under 35 U.S.C. 154(b) by 67 days.

(21) Appl. No.: 18/014,034

(22) PCT Filed: Jul. 6, 2021

(86) PCT No.: PCT/FI2021/050521
§ 371 (c)(1),
(2) Date: Dec. 30, 2022

(87) PCT Pub. No.: WO2022/008797
PCT Pub. Date: Jan. 13, 2022

(65) Prior Publication Data

US 2023/0298543 A1 Sep. 21, 2023

(30) Foreign Application Priority Data

Jul. 10, 2020 (FI) .................................... 20205745

(51) Int. Cl.
*G10C 3/10* (2019.01)
*G10C 1/00* (2006.01)
*G10C 9/00* (2019.01)

(52) U.S. Cl.
CPC ................ *G10C 3/10* (2013.01); *G10C 1/00* (2013.01); *G10C 9/00* (2013.01)

(58) Field of Classification Search
CPC ............... G10C 3/10; G10C 1/00; G10C 9/00
See application file for complete search history.

(56) References Cited

U.S. PATENT DOCUMENTS

| | | | | | |
|---|---|---|---|---|---|
| 1,859,553 | A * | 5/1932 | Crane | G10D 3/10 | 84/199 |
| 3,474,180 | A * | 10/1969 | Monici | G10H 3/18 | 984/367 |
| 4,156,380 | A | 5/1979 | Fulton | | |
| 4,509,399 | A * | 4/1985 | McKibben | G10C 9/00 | 84/234 |
| 6,723,905 | B2 * | 4/2004 | Gillis | G10D 3/053 | 84/317 |
| 7,692,079 | B2 * | 4/2010 | Lyles | G10D 3/14 | 84/312 R |

(Continued)

FOREIGN PATENT DOCUMENTS

| | | | |
|---|---|---|---|
| CN | 2877964 | Y | 3/2007 |
| CN | 104084901 | A | 10/2014 |

(Continued)

OTHER PUBLICATIONS

International Search Report in Application No. PCT/FI2021/050521, mailed Sep. 16, 2021, 2 pages.

(Continued)

*Primary Examiner* — Robert W Horn
(74) *Attorney, Agent, or Firm* — Meunier Carlin & Curfman LLC

(57) ABSTRACT

The invention is a micro-tuning device for pianos and other keyboard-operated stringed musical instruments. A mass is secured to a single string or choir of strings in the musical instrument by an attachment device between the bridge and the agraffe, nut or V-bar, thereby reducing the speaking length and increasing the pitch of the string.

18 Claims, 3 Drawing Sheets

(56) References Cited

U.S. PATENT DOCUMENTS

| | | | | |
|---|---|---|---|---|
| 2007/0209496 | A1* | 9/2007 | Lenzi | G10D 3/046 84/313 |
| 2008/0023617 | A1* | 1/2008 | Ho | A47G 21/167 248/500 |
| 2011/0067548 | A1* | 3/2011 | Toone | G10D 3/14 84/312 R |
| 2023/0298543 | A1* | 9/2023 | Ikonen | G10C 3/10 84/200 |

FOREIGN PATENT DOCUMENTS

| | | | |
|---|---|---|---|
| DE | 602203 | C | 9/1934 |
| DE | 78669 | C | 6/1984 |
| DE | 4209201 | A1 | 9/1993 |
| JP | S5320023 | U | 2/1978 |
| JP | 2006003530 | A | 1/2006 |
| WO | 9522140 | A1 | 8/1995 |
| WO | 03060872 | A2 | 7/2003 |

OTHER PUBLICATIONS

Search Report in Finnish Application No. 20205745, dated Jan. 20, 2021, 2 pages.

Office Action issued by the European Patent Office for Application No. 21749663.7, dated Mar. 19, 2024, 5 pages.

* cited by examiner

MICRO-TUNING DEVICE

CROSS REFERENCES

This application is a U.S. national stage application of international patent application number PCT/FI2021/050521 filed on Jul. 6, 2021 claiming priority to Finnish national application number FI20205745 filed on Jul. 10, 2020.

FIELD OF THE INVENTION

The invention is a micro-tuning device for pianos and other keyboard-operated stringed musical instruments, such as harpsichords or fortepianos.

BACKGROUND

In some folk music traditions, especially Turkish & Arabic music, the scales (or Maqamat in Arabic) include pitches that are unknown in western music, so-called micro-intervals, that are tuned between the ½-steps of the western 12-note system, e.g. half-flat E or half-sharp F. These notes can be played on many wind instruments, fretless string instruments like oud or violin, Turkish or Arabic qanun. Some electronic instruments, like synthesizers, can be programmed to play micro intervals as well. However, the regular piano and other keyboard-operated stringed instruments, such as harpsichords and clavichords, are tuned according to well-tempered 12-note system, and all the pitches outside this system have to be produced by tuning the actual string or choir of strings (up to 3 strings per each pitch) by the tuning pins.

However, tuning a piano—whether to produce micro-intervals or retuning it to the 12-note system—takes a significant length of time and special expertise. Furthermore, tuning a piano via the tuning pins to produce notes at micro-intervals causes unpleasant sounds. Thus, tuning and re-tuning the piano every time micro-intervals notes are required is not practical and certainly cannot be done quickly, for example in live concert situations.

For non-keyboard operated string instruments, such as guitars, a capo or capo tasto can be used to change the tuning of all the strings. For fretless string instruments, the capo could be used for micro-tuning the strings e.g. ¼-step up, but it would alter the pitch of all of the strings, thus eliminating the changes in intervals between notes.

In the field of keyboard operated string instruments, the need to retune strings to quarter intervals such as half-sharp has been addressed by quarter-tone pianos, which consist of two pianos with two keyboards stacked one above the other in a single case, one tuned a quarter tone higher than the other. However, such instruments are rare, expensive, very large and heavy and cannot usually be transported, e.g. for concerts.

SUMMARY OF THE INVENTION

A first aspect of the invention relates to a micro-tuning device for a keyboard-operated stringed musical instrument. The device comprises a mass and an attachment device, wherein the attachment device is configured to attach the micro-tuning device to a string or choir of strings of the musical instrument, wherein the mass is configured to be attached to the string between the bridge and agraffe, nut or V-bar such that the speaking length of the string or choir of strings is decreased compared to the open string or choir of strings.

The device may further comprise a support, wherein the support is configured to rest on an agraffe, V-bar or pressure bar of the musical instrument, on the string or choir of strings above a nut and/or on the string or choir of strings between the mass and the agraffe or nut or between the mass and a tuning pin.

The support may be wedge-shaped. The thickest end of the wedge-shaped support may be configured to be positioned on an agraffe, V-bar or pressure bar of the musical instrument, on the string or choir of strings above a nut, or on the string or choir of strings between the attachment device and the agraffe, nut or V-bar, such that the wedge decreases in thickness towards the attachment device.

The mass may have at least one rounded edge, wherein the rounded edge engages with the support such that the angle of the mass with respect to the string or choir of strings is adjustable by adjusting the position of the support.

The support may comprise one or more magnets for holding the mass and/or securing the support to the agraffe, V-bar, pressure bar or string or choir of strings of the musical instrument.

In an alternative embodiment, the support may be configured to be fixed to the body of the musical instrument and extend across multiple strings or choirs of strings and may be capable of supporting multiple masses on the multiple strings or choirs of strings, or a single mass with multiple, independently adjustable tips for engaging multiple strings or choirs of strings.

The mass preferably comprises a V-shaped tip or corner for engaging the string or choir of strings.

The attachment device may comprise a magnet for attaching the device to a ferromagnetic string or choir of strings.

The mass may comprise a magnet and the magnets of the mass and attachment device may be arranged such that an attractive magnetic force is produced between the magnet of the mass and the magnet of the attachment device when placed on opposite sides of the string or choir of strings.

The attachment device is preferably configured to be positioned on the opposite side of the string or choir of strings to the mass and to apply pressure to the string or choir of strings between the attachment device and the mass in order to hold the device in place.

The attachment device is preferably thin enough to fit between the strings/choirs of strings of the musical instrument.

The mass is preferably large enough to prevent vibration of the string or choir of strings between the mass and the agraffe, nut or V-bar.

The length of the mass, measured along the axis of the string or choir of strings, is preferably larger than the width of mass.

The device may further comprise a strap for securing the mass to the body of the piano. The strap may be attached to the mass and be connectable to the body of the piano via one or more magnets.

A second aspect of the invention relates to a method for micro-tuning a keyboard-operated stringed musical instrument. The method comprises attaching the device of any preceding claim to a string or choir of strings of the musical instrument in order to reduce the speaking length of the string or choir of strings of the musical instrument.

DETAILED DESCRIPTION

Figure 1:
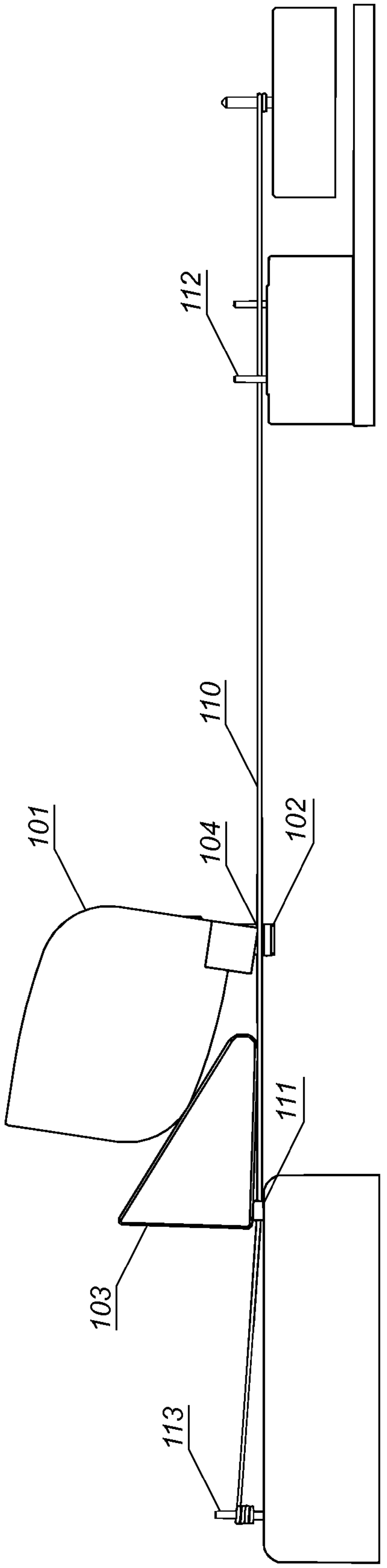
FIG. 1 shows the micro-tuning device of the present invention positioned on a single string or choir of strings for producing a single note in a grand piano.

FIG. 1 shows the micro-tuning device of the present invention positioned on a single string or choir of strings for producing a single note in a grand piano. The micro-tuning device is made up of main body, or mass, 101, which is fixed to the string or choir of strings 110 with the attachment device 102. A support 103 also forms part of the device, holding the mass 101 in position over the string 110.

There are three main factors that affect the tuning of a string in a piano: the length of the string, the mass/thickness of the string and the string tension. In a grand piano, then length of the string or choir of strings 110 is determined by the distance between the agraffe 111 and bridge pin 112 for the bass and tenor strings (as shown in FIG. 1) and between a capo d'astro or V-bar and bridge pin for treble pitch strings. This length of each string 110 that is located between the agraffe 111 or capo d'astro/V-bar and bridge pin 112 is free to vibrate when struck by the hammer and is called the speaking length of the string. The agraffe 111 and bridge pin 112 are in fixed positions relative to one another and the body of the piano, thus the length between the agraffe 111 and bridge pin 112 for each string or choir of strings is fixed. The mass/thickness of the string is determined by the type of string that is used. Therefore, in normal use, each string, and the piano as a whole, is tuned by adjusting the tension in the string by turning the tuning pin 113.

The micro-tuning device of the present invention changes the pitch of the string or choir of strings on which it is placed by stopping vibration of the string at a point between the agraffe 111 or capo d'astro/V-bar and the bridge pin 112, thus creating a new speaking length for the string 110 between the tip 104 of the mass 101, which is in contact with the string 110, and the bridge pin 112, which is shorter than the open speaking length of the string, i.e. the distance between the agraffe 111 or capo d'astro/V-bar and the bridge pin 112. Unlike conventional tools for reducing the speaking length of a string, such as a capo tasto, which is conventionally used to adjust the pitch of the strings of a guitar, the micro-tuning device is attached to a single string or choir of strings using the attachment device 102, not to the body of the instrument. This allows only the pitch of the desired string or choir of strings to be altered, or for multiple devices to be used to adjust the pitch of different strings by different amounts.

Figure 2:
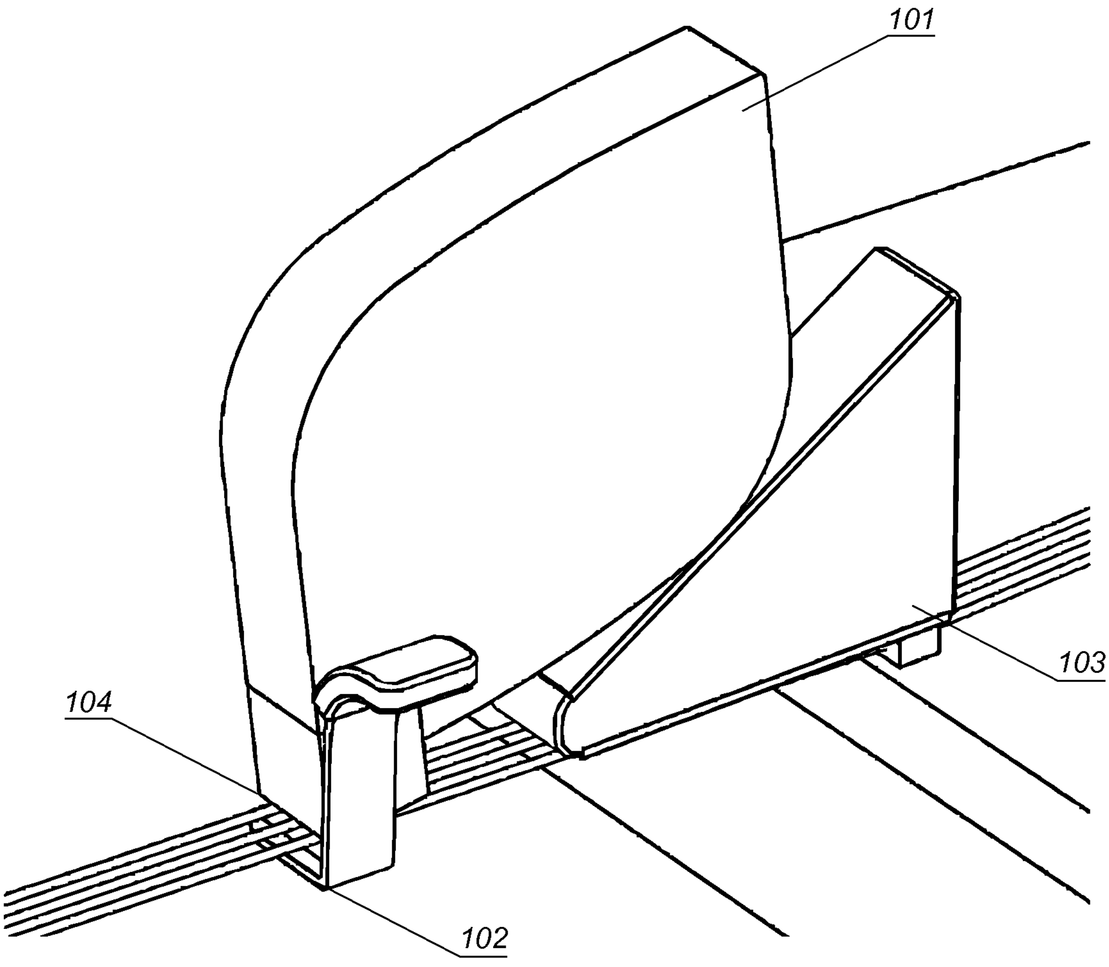
FIG. 2 shows the micro-tuning device of the present invention in more detail.

FIG. 2 shows the micro-tuning device of the present invention in more detail. As mentioned above, the mass 101 is configured to be placed above a string or choir of strings of the grand piano, and the attachment device 102 is disposed at least partially below the string or choir of strings. The device is fixed in position along the length of the string or choir of strings by squeezing the string or choir of strings between the mass 101 and the attachment device 102.

The vibration of the string or choir of strings, when struck by the hammer, is stopped at the tip 104 of the mass 101. The tip 104 may be V-shaped or any other suitable shape for defining a sharp point at which vibration of the string is stopped.

In order to stop the vibration of the string at the tip point 104, the mass 101 must be sufficiently heavy, i.e. preferably at least 200 g, although the device functions with lower masses albeit with reduced sound quality. Thus, in order to prevent the size of the mass 101 from being excessive, it is preferably made from a relatively high-density material, such as steel. Furthermore, to be stable enough on the string, i.e. to prevent tilting of the mass which could cause twisting of the string or choir of strings, which would negatively affect the tone and further adjust the pitch, the mass 101 cannot be too high or too wide and cannot extend too much towards the bridge. The shape of the mass 101 therefore extends from the tip 104 and, when placed on the strings, extends towards (and potentially past) the agraffe or V-bar. The support 103 supports the shape of the mass 101 and may lie on the strings where it does not significantly affect the sound, for example between the tip 104 and the agraffe or V-bar, or between the tip 104 and the tuning pin 113.

Most of the sound of the ringing open strings is transmitted to the soundboard of the piano via the bridge. However, a non-negligible part of the sound is transmitted to the soundboard from the other end of the speaking length of the open strings, i.e. through the agraffes and the cast iron frame. The support 103 is therefore preferably also made of a metal or some other material that effectively transmits vibration from the mass 101 to the agraffe or V-bar on which the support 103 may also be positioned, from where it is transmitted via the iron frame to the soundboard.

The support 103 preferably has upper and lower magnets that keep it firmly in place on the strings and/or agraffe and which firmly hold the mass 101 to the support 103.

The support 103 is wedge-shaped so that the rounded shape of the mass 101 engages with the support 103 such that the angle of the mass with respect to the string or choir of strings is adjustable by adjusting the position of the support. The angle of the tip 104 relative to the string or choir of strings affects the sound quality, thus by moving the support wedge 103 along the string, the angle of the tip 104 and the sound quality can be adjusted.

In an alternative embodiment, a single support may be provided for multiple masses 101 positioned on different strings or choirs of strings within the piano. A single support such as this may extend over multiple strings or choirs of strings in order to support the multiple masses and may be connected directly to the piano body, e.g. to the pin board, or may be an integral part of the cast-iron frame, in order to provide the necessary support and to transmit vibration from the string to the piano body, including the soundboard. As an alternative to supporting multiple masses, a single support may support a single, wide mass that extends above several strings or choirs of strings, e.g. of one octave, and has multiple, independently adjustable tips for adjusting the speaking length of the strings/choirs of strings independently.

The part of the attachment device 102 which is placed below the string or choir of strings is thin or narrow enough so that it can be placed between the strings or between choirs of strings in the piano for easy installation of the device. Preferably, the part of the attachment device which is placed below the string or choir of strings is 4 mm thick or thinner, which is the standard spacing between strings/choirs of strings for producing different notes on a grand piano. Other sizes may be appropriate for different instruments. The attachment device 102 can attach to the mass 101 and provide the require pressure on the string or choir of strings in any suitable manner. For example, The attachment device 102 may include a strong magnet that is placed below the strings and a strong magnet may also be placed in the mass 101. The magnets in the attachment device 102 and the mass 101 are arranged to attract each other. This is the arrangement depicted in the drawings.

Alternatively, the attachment device 102 may be tightened towards the mass 101 with screws & nuts on both sides of a horizontal bar which passes under the strings or choir of strings.

As a further alternative, the attachment device 102 may include a rectangular C-shaped peg (e.g. [-shaped) that is placed below the strings such that the string of choir of strings sit within the C-shape and each end of the C-shape extends above the strings and comes into contact with the mass 101, where it may be tightened with, for example, a lever and a screw; a screw, a nut and a freely rotating plate above it; a strong spring; or a lever and cam; or any other appropriate method.

As a further alternative, the attachment device 102 may include a rectangular C-shaped bracket (e.g. [-shaped) that extends around the mass 101 and the strings, such that one end of the C-shape extends above the mass the other end of the C-shape extends below the strings. The attachment device may be tightened such that the end of the C-shape that lies below the strings is drawn towards the mass 101 to secure the strings between the mass 101 and the end of the C-shape. The tightening action may be achieved by, for example, a lever and a screw; a screw, a nut and a freely rotating plate above it; a strong spring; a lever and a cam, or a cam.

In an alternative embodiment, the attachment device may not be a separate component to the mass 101, as shown in FIG. 2, but rather may be an integral part of the mass that remains above the strings. For example, the attachment device may simply be a strong magnet at the tip 104 of the mass 101. Piano strings are typically made of steel, a ferromagnetic material, thus the magnet in the mass 101 is attracted to the piano strings. In this embodiment, the mass 101 may be heavier, i.e. larger or denser, in order to provide the required force to hold the mass 101 to the strings.

Figure 3:
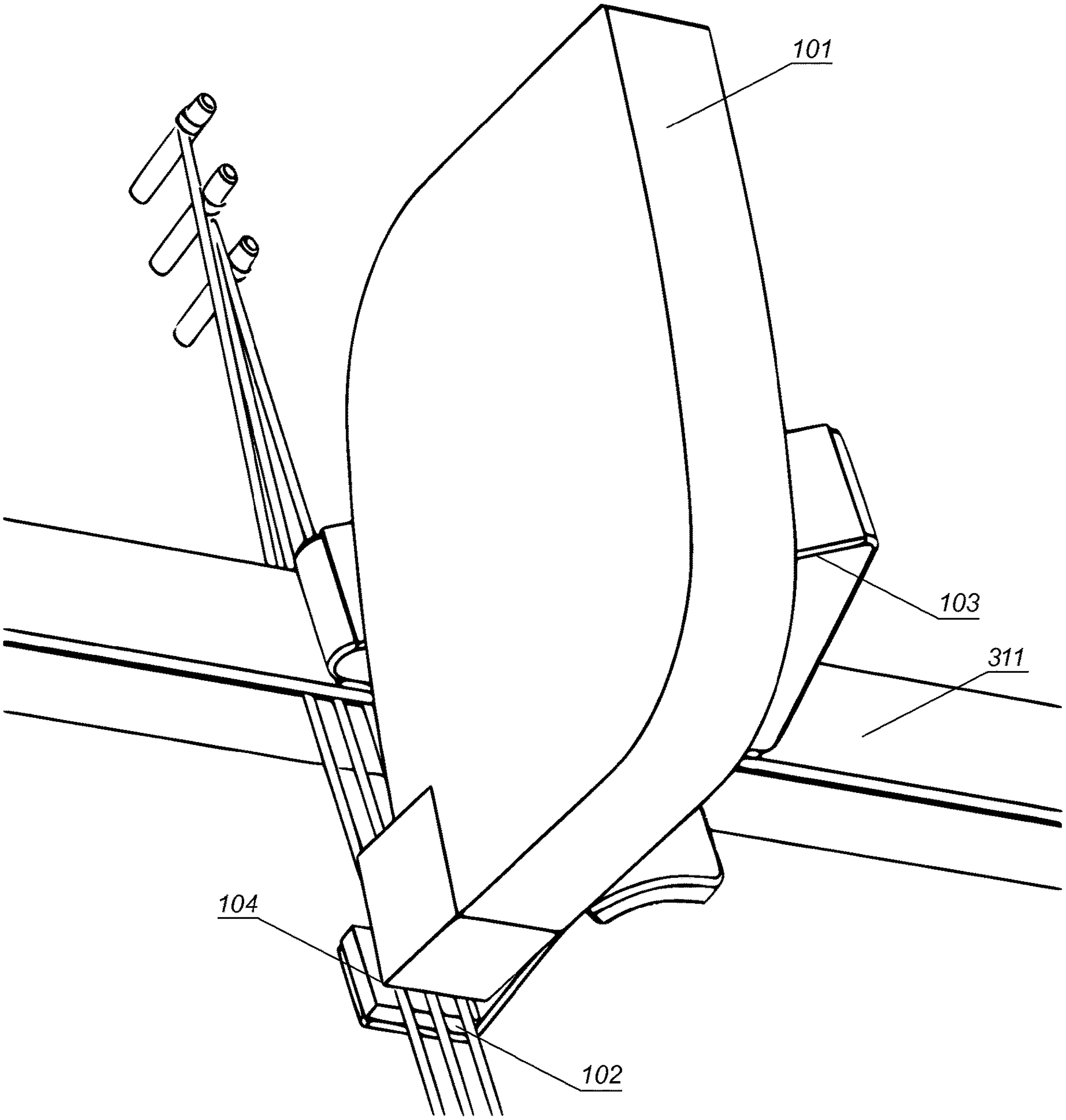
FIG. 3 shows the micro-tuning device of the present invention in use in an upright piano.

FIG. 3 shows the micro-tuning device in place in an upright piano. The micro-tuning device as described above may also be used with an upright piano. However, since the strings of an upright piano are arranged vertically, in contrast to the horizontal strings of a grand piano, the weight of the mass 101 is no longer providing a force keeping the mass 101 in contact with the strings. Thus, vibration of the strings may cause the mass 101 to move, for example by falling down the strings, causing the pitch to gradually increase. This problem is solved by the support 103, which is placed between the mass 101 and the pressure bar 311 of the upright piano. The support 103 includes a magnet which is attracted to the mass 101, either because the mass 101 is made from a ferromagnetic material or by a corresponding magnet on the mass 101. Another magnet secures the support 103 to the ferromagnetic pressure bar 311. To maximise the magnetic attraction between the support 103 and the pressure bar, the support 103 may be arranged such that its longest axis runs parallel to the pressure bar, i.e. perpendicular to the string and perpendicular to the longest axis of the mass 101. Due to the wedge shape of the support 103, however, the support can still be easily positioned along the pressure bar to support the mass 101 at the correct angle with respect to the strings.

To further secure the mass, the upper edge of the mass 101, i.e. the edge of the mass 101 which extends above the pressure bar 311, can be tied to the body of the piano with a strap that is attached to the mass 101 and to the body of the piano by another set of magnets (not shown in FIG. 3).

While the device has been described above in use with grand and upright pianos, it will be appreciated that it may be applied to any keyboard operated stringed instrument which uses a separate string or choir of strings to produce each note. Thus, the piano specific terms, such as agraffe or V-bar used above should not be taken as limiting where other instruments use slightly different devices, for example, in a harpsichord, which uses a nut to define the speaking length opposite the bridge.

The invention claimed is:

1. A micro-tuning device for a keyboard-operated stringed musical instrument, the device comprising:

a mass, an attachment device, and a support, wherein the attachment device is configured to attach the mass to a string or choir of strings of the musical instrument;

wherein the mass is configured to be attached to the string or choir of strings between a bridge and an agraffe, nut or V-bar, wherein the mass is configured to stop vibration of the string or choir of strings at a point between the agraffe, nut or V-bar and the bridge, such that vibration of the string or choir of strings between the mass and the agraffe, nut or V-bar is prevented, thereby decreasing the speaking length of the string or choir of strings compared to the open string or choir of strings, and wherein the support is configured to rest on the agraffe, V-bar or pressure bar of the musical instrument, on the string or choir of strings above a nut and/or on the string or choir of strings between the mass and the agraffe or nut or between the mass and a tuning pin.

2. The micro-tuning device of claim 1, wherein the support is wedge-shaped.

3. The micro-tuning device of claim 2, wherein the thickest end of the wedge-shaped support is configured to be positioned on the agraffe, V-bar or pressure bar of the musical instrument, on the string or choir of strings above a nut, or on the string or choir of strings between the attachment device and the agraffe, nut or V-bar, and wherein the wedge decreases in thickness towards the attachment device.

4. The micro-tuning device of claim 2, wherein the mass has at least one rounded edge, wherein the rounded edge engages with the support such that the angle of the mass with respect to the string or choir of strings is adjustable by adjusting the position of the support.

5. The micro-tuning device of claim 1, wherein the support comprises one or more magnets for holding the mass and/or securing the support to the agraffe, V-bar, pressure bar or the string or choir of strings of the musical instrument.

6. The micro-tuning device of claim 1, wherein the mass comprises a V-shaped tip or corner for engaging the string or choir of strings.

7. The micro-tuning device of claim 1, wherein the attachment device comprises a magnet for attaching the mass to a ferromagnetic string or choir of strings.

8. The micro-tuning device of claim 7, wherein the mass comprises a magnet and wherein the magnets of the mass and attachment device are arranged such that an attractive magnetic force is produced between the magnet of the mass and the magnet of the attachment device when placed on opposite sides of the string or choir of strings.

9. The micro-tuning device of claim 1, wherein the attachment device is configured to be positioned on the opposite side of the string or choir of strings to the mass and to apply pressure to the string or choir of strings between the attachment device and the mass in order to hold the device in place.

10. The micro-tuning device of claim 1, wherein the length of the mass, measured along the axis of the string or choir of strings, is larger than the width of mass.

11. The micro-tuning device of claim 1, wherein the device further comprises a strap for securing the mass to the body of the musical instrument, wherein the musical instrument is a piano.

12. A method for micro-tuning a keyboard-operated stringed musical instrument, comprising attaching the device of claim 1 to a string or choir of strings of the musical instrument in order to stop vibration of the string or choir of strings at a point between the agraffe, nut or V-bar and the bridge of the musical instrument, thereby decreasing the speaking length of the string or choir of strings of the musical instrument.

13. The micro-tuning device of claim 11, wherein the strap is attached to the mass and is connectable to the body of the piano via one or more magnets.

14. A micro-tuning device for a keyboard-operated stringed musical instrument, the device comprising:

a mass, an attachment device, and a support, wherein the attachment device is configured to attach the mass to a string or choir of strings of the musical instrument;

wherein the mass is configured to be attached to the string or choir of strings between a bridge and an agraffe, nut or V-bar, wherein the mass is configured to stop vibration of the string or choir of strings at a point between the agraffe, nut or V-bar and the bridge, such that vibration of the string or choir of strings between the mass and the agraffe, nut or V-bar is prevented, thereby decreasing the speaking length of the string or choir of strings compared to the open string or choir of strings, and wherein the support is configured to be fixed to the body of the musical instrument, and wherein the support extends across multiple strings or choirs of strings and is capable of supporting multiple masses, or a single mass with multiple, independently adjustable tips for engaging multiple strings or choirs of strings.

15. A micro-tuning device for a keyboard-operated stringed musical instrument, the device comprising:

a mass, an attachment device, and a support, wherein the attachment device is configured to attach the mass to a string or choir of strings of the musical instrument;

wherein the mass is configured to be attached to the string or choir of strings between a bridge and a first agraffe, nut or V-bar, wherein the mass is configured to stop vibration of the string or choir of strings at a point between the first agraffe, nut or V-bar and the bridge, such that vibration of the string or choir of strings between the mass and the first agraffe, nut or V-bar is prevented, thereby decreasing the speaking length of the string or choir of strings compared to the open string or choir of strings, and wherein the support is configured to rest on a second agraffe, V-bar or pressure bar of the musical instrument, on the string or choir of strings above a nut and/or on the string or choir of strings between the mass and the second agraffe or nut or between the mass and a tuning pin.

16. The micro-tuning device of claim 15, wherein the support is wedge-shaped, wherein the thickest end of the wedge-shaped support is configured to be positioned on the second agraffe, V-bar or pressure bar of the musical instrument, on the string or choir of strings above a nut, or on the string or choir of strings between the attachment device and the second agraffe, nut or V-bar, and wherein the wedge decreases in thickness towards the attachment device.

17. The micro-tuning device of claim 15, wherein the first agraffe, nut or V-bar and the second agraffe, nut or V-bar are the same.

18. The micro-tuning device of claim 15, wherein the first agraffe, nut or V-bar and the second agraffe, nut or V-bar are different.

* * * * *